(12) United States Patent
Kang et al.

(10) Patent No.: US 9,239,599 B2
(45) Date of Patent: Jan. 19, 2016

(54) COMBINATIONAL COOLING PAD STRUCTURE WITH FLASH DRIVE STORAGE

(71) Applicants: Yu-Ping Kang, Taichung (TW); Yau-Ren Shiau, Taichung (TW); Yu-Lan Chen, Taichung (TW); Wei-Sheng Chen, Taichung (TW); Wei-Chun Hung, Taichung (TW)

(72) Inventors: Yu-Ping Kang, Taichung (TW); Yau-Ren Shiau, Taichung (TW); Yu-Lan Chen, Taichung (TW); Wei-Sheng Chen, Taichung (TW); Wei-Chun Hung, Taichung (TW)

(73) Assignee: Feng Chia University, Taichung (TW)

( * ) Notice: Subject to any disclaimer, the term of this patent is extended or adjusted under 35 U.S.C. 154(b) by 115 days.

(21) Appl. No.: 14/198,310

(22) Filed: Mar. 5, 2014

(65) Prior Publication Data
US 2015/0124392 A1 May 7, 2015

(30) Foreign Application Priority Data

Nov. 5, 2013 (TW) .............................. 102140025 A (51) Int. Cl.
*G06F 1/20* (2006.01)
(52) U.S. Cl.
CPC . *G06F 1/20* (2013.01); *G06F 1/203* (2013.01)
(58) Field of Classification Search
CPC .................................. G06F 1/20; G06F 1/203
See application file for complete search history.

(56) References Cited

U.S. PATENT DOCUMENTS

| | | | | |
|---|---|---|---|---|
| 6,082,696 A * | 7/2000 | Patterson | | 248/454 |
| 7,173,819 B2 * | 2/2007 | Wilcox | | 361/679.48 |
| 7,177,150 B2 * | 2/2007 | Kazuhiro | | 361/695 |
| 7,362,564 B2 * | 4/2008 | Emery et al. | | 361/679.32 |
| 8,075,073 B2 * | 12/2011 | Huang | | 312/330.1 |
| 2006/0061964 A1 * | 3/2006 | Cheng | | 361/687 |
| 2008/0037213 A1 * | 2/2008 | Haren | | 361/687 |
| 2010/0018441 A1 * | 1/2010 | Goldwitz | | 108/1 |
| 2013/0063889 A1 * | 3/2013 | Yee et al. | | 361/679.48 |

* cited by examiner

*Primary Examiner* — Lisa Lea Edmonds
(74) *Attorney, Agent, or Firm* — Che-Yang Chen; Law Office of Michael Chen (57) ABSTRACT

A combinational cooling pad structure with flash drive storage comprises a cooling pad and a flash drive. The cooling pad comprises at least three combinational pads with structural surfaces. At least two connecting portions are correspondingly disposed between the combinational pads. Limiting structures are correspondingly disposed on outer sides of the outer combinational pads. The combinational pads are connected by the connecting portions to form a structure which can be unfolded flatly; and are folded closely together to form a structural body surrounded by the structural surfaces; and are combined securely by the corresponding limiting structures. An inner hole for inserting the flash drive is defined and formed by inner surfaces of the surrounding combinational pads. A coupling portion is protrudingly disposed at an end of the flash drive, and an interface connector is disposed on the coupling portion. The coupling portion is then inserted into the inner hole.

15 Claims, 13 Drawing Sheets

COMBINATIONAL COOLING PAD STRUCTURE WITH FLASH DRIVE STORAGE

BACKGROUND OF THE INVENTION

1. Field of Invention

The present invention relates to a combinational cooling pad structure with flash drive storage and more particularly to a combinational cooling pad structure with flash drive storage which can be unfolded for placing and cooling a laptop; folded to form a stylish structural body for placing uprightly for decoration and saving space; provided for inserting, storing and pulling out a flash drive conveniently; and used as a souvenir for marketing sightseeing spots.

2. Related Art

According to Taiwan utility patents "Improved Structure of Cooling Pad" with publication number M423287, "Cooling Pad" with publication numbers M432865 and M325541, design patents "Cooling Pad" with publication numbers D151056, D150286, D149695, D147444, D142248, D142882, D131072 and D118400, and design patents "Cooling Pad 2" with publication number D130525 and "Cooling Pad 3" with publication number D130527; the structures of the previous patents are in a fixed flat shape and only function as a cooling and supporting means for laptops. The first disadvantage is that, each of the structures takes up too much desk space when it is not being used, which will cause obstruction and inconvenience in using the desk.

Even though some of the above design patents "Cooling Pad" are stylishly and aesthetically designed, the designs are hidden under the laptops during usage. Because of their fixed flat structures which take up a lot of space and can only provide a single function, the cooling pads are not likely to be left on the desk when the laptop is not being used. Thus, the cooling pads cannot be used for decoration, which is the second disadvantage.

Lastly, the cooling pads have to be stored away because the fixed flat structures take up too much space on the desk; it will be very inconvenience for taking out the cooling pads from the storage location when they are needed, which is the third disadvantage.

SUMMARY OF THE INVENTION

The present invention of a combinational cooling pad structure with flash drive storage aims to solve the drawbacks and inconvenience of the above cooling pad structures; namely, a certain desk space is occupied which will cause obstruction using the desk or has to be stored away when not in use, and cannot be used for decoration.

A primary objective of the present invention is to provide a combinational cooling pad structure with flash drive storage which can be folded to form a stylish structural body when not in use for placing uprightly for decoration and saving space.

A secondary objective of the present invention is to provide a combinational cooling pad structure with flash drive storage which can be folded to form an inner hole surrounded by inner surfaces for inserting, storing and pulling out a flash drive conveniently.

A third objective of the present invention is to provide a combinational cooling pad structure with flash drive storage with a combinational structural body which can be designed to match a tourism landmark shape and used as a souvenir for marketing sightseeing spots.

A combinational cooling pad structure with flash drive storage provided by the present invention comprising:

a cooling pad comprising at least three combinational pads with structural surfaces, at least two connecting portions being correspondingly disposed between each of the combinational pads, wherein limiting structures are correspondingly disposed on outer sides of the two outer combinational pads, the combinational pads are connected by the connecting portions to form a structure which can be unfolded flatly, are folded closely together to form a structural body surrounded by the structural surfaces, and are combined securely by the corresponding limiting structures, an inner hole for inserting a flash drive is defined and formed by inner surfaces of the surrounding combinational pads; and a flash drive with a main body being a corresponding structure for an inserting location of the structural body composed of the combinational pads, a coupling portion being protrudingly disposed at an end of the main body, an interface connector being disposed on the coupling portion, the coupling portion being inserted into the inner hole at an end of the structural body for forming the decorative structural body.

A combinational cooling pad structure with flash drive storage according to a second embodiment of the present invention comprising:

a cooling pad comprising a first combinational pad, a second combinational pad, a third combinational pad and a fourth combinational pad with structural surfaces, wherein the first combinational pad is a trilateral pad, the second combinational pad is a long quadrilateral pad, a side of the first combinational pad is connected to a short side of the second combinational pad by at least two connecting portions, two long lateral sides of the second combinational pad are connected to the third combinational pad and the fourth combinational pad respectively by at least two of the connecting portions, limiting structures are correspondingly disposed on outer sides of the third combinational pad and the fourth combinational pad, the combinational pads are connected by the connecting portions to form a structure which can be unfolded flatly, are folded closely together to form a structural body surrounded by the structural surfaces, and are combined securely by the corresponding limiting structures, a slot for inserting a flash drive is disposed on an outer surface of any one of the combinational pads; and a flash drive with an interface connector disposed at an end of a main body being inserted into the slot correspondingly, the main body being a corresponding structure for an inserting location of the structural body composed of the combinational pads for forming the decorative structural body.

Based on the above, limiting protruded columns and limiting recesses for securely coupling with each other are correspondingly disposed on two lateral sides of the first combinational pad as well as inner surfaces of the third combinational pad and the fourth combinational pad for composing the limiting structures correspondingly.

Based on the above, the limiting structures are composed of the limiting protruded columns and the limiting recesses disposed on the outer sides of the two outer combinational pads for securely coupling with each other.

Based on the above, the limiting structures are magnetic elements disposed on the outer sides of the two outer combinational pads for magnetically attracted to each other securely.

Based on the above, the connecting portions are tenacious band structures.

Based on the above, the connecting portions are hinge structures.

The present invention will become more fully understood by reference to the following detailed description thereof when read in conjunction with the attached drawings.

DETAILED DESCRIPTION OF THE INVENTION

A combinational cooling pad structure with flash drive storage of the present invention preferably comprises a cooling pad which can be folded for composing and structuring as a structural body (Taipei 101 is used as an embodiment in the specifications) when not in use, and a flash drive with an interface connector inserted into and installed on the cooling pad for composing a decorative structural body.

Figure 1:
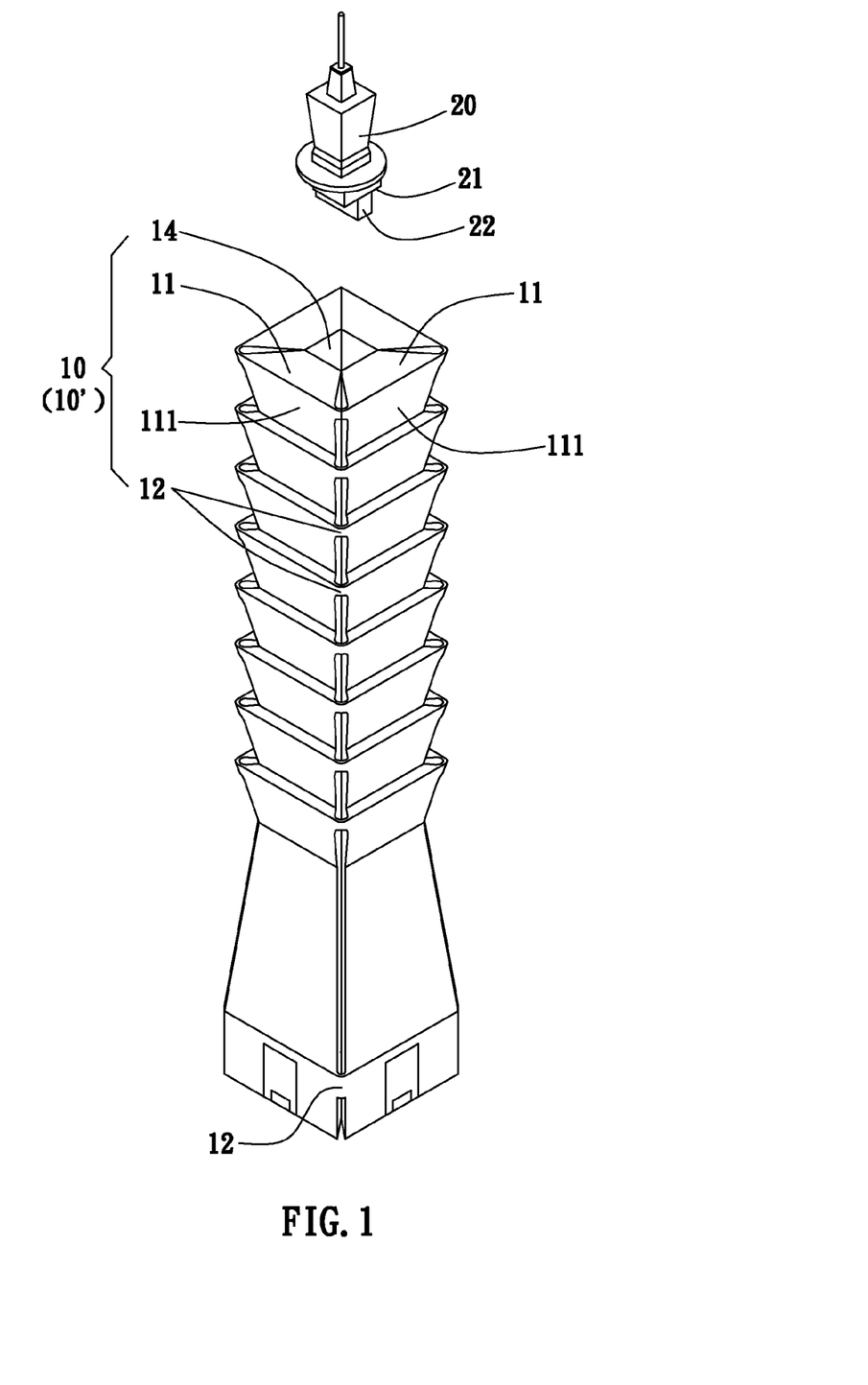
FIG. 1 is a perspective explosive view of a combinational cooling pad structure with flash drive storage of the present invention.
Figure 2:
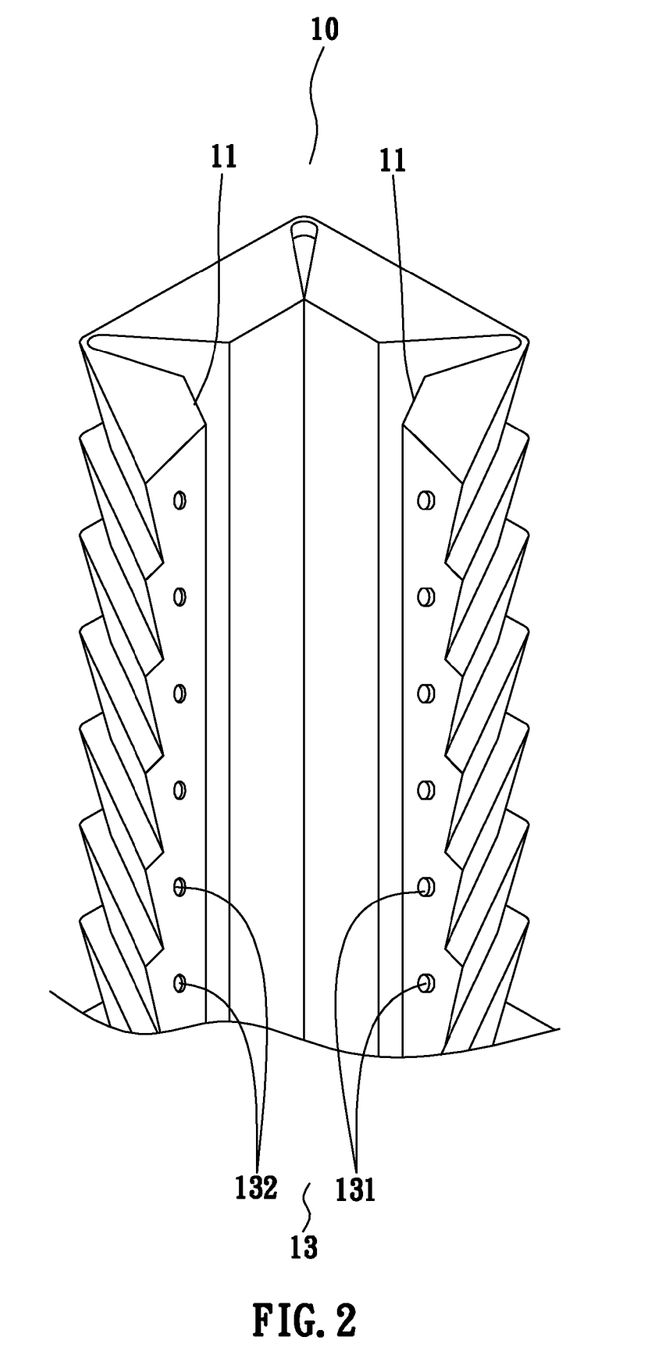
FIG. 2 is a perspective structural view of a cooling pad disposed with limiting structures of the present invention.

Please refer to FIGS. 1 and 2. FIG. 1 is a perspective explosive view of the combinational cooling pad structure with flash drive storage of the present invention; and FIG. 2 is a perspective structural view of the cooling pad disposed with limiting structures of the present invention. The combinational cooling pad structure with flash drive storage is composed of a cooling pad 10 and a flash drive 20.

Figure 3:
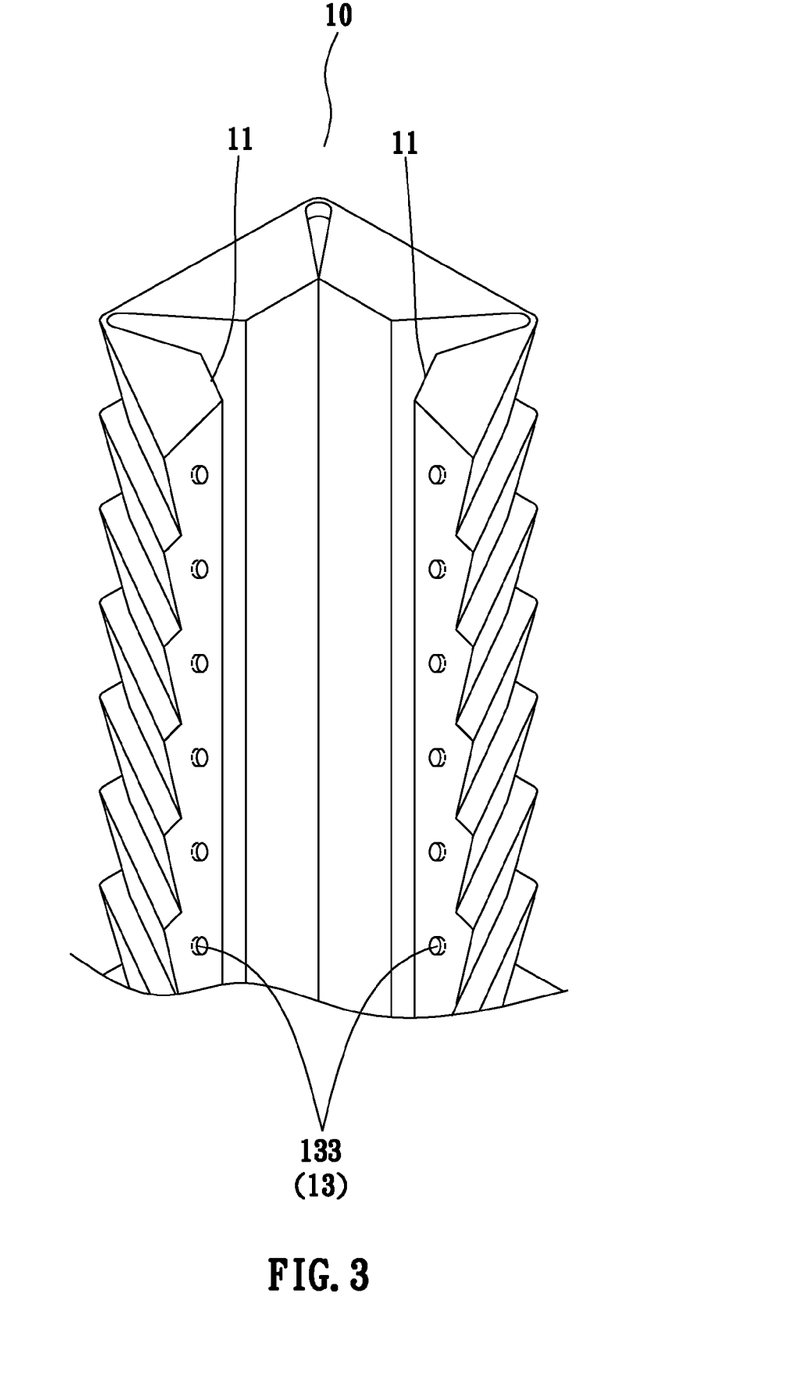
FIG. 3 is a perspective structural view of the cooling pad disposed with magnetic elements as the limiting structures of the present invention.

The cooling pad 10 comprises at least more than three combinational pads 11 with structural surfaces 111 (as accidented structures on the walls of Taipei 101 shown in the figures). At least two connecting portions 12 are correspondingly disposed between each of the combinational pads 11. Limiting structures 13 are correspondingly disposed on outer sides of the two outer combinational pads 11. As shown in FIG. 2, the limiting structures 13 are composed of limiting protruded columns 131 and limiting recesses 132 disposed on the corresponding outer sides of the two outer combinational pads 11 for securely coupling with each other; or, as shown in FIG. 3, the limiting structures 13 are composed of magnetic elements 133 disposed on the corresponding outer sides of the two outer combinational pads 11 for magnetically attracted to each other securely.

The flash drive 20 with a main body being shaped as a structure (as the pointed structure of Taipei 101 in this embodiment) corresponding to a coupling end of the structural body. A coupling portion 21 is protrudingly disposed at an end of the main body. An interface connector 22 is disposed on the coupling portion 21.

As shown in FIG. 1, the connecting portions 12 are tenacious band structures. Moreover, the connecting portions 12 can also be disposed as hinge structures (not shown in the figures). The combinational pads 11 of the cooling pad 10 are connected by the connecting portions 12 for folding together towards each other in order to form a structural body 10' surrounded by the structural surfaces 111, and are coupled securely by the corresponding limiting structures 13. A rectangular inner hole 14 for inserting the flash drive 20 is defined and formed by inner surfaces of the surrounding combinational pads 11. The coupling portion 21 of the flash drive 20 is inserted into the rectangular inner hole 14 at an end of the structural body 10' for forming the decorative structural body 10' as shown in FIG. 4.

Figure 4:
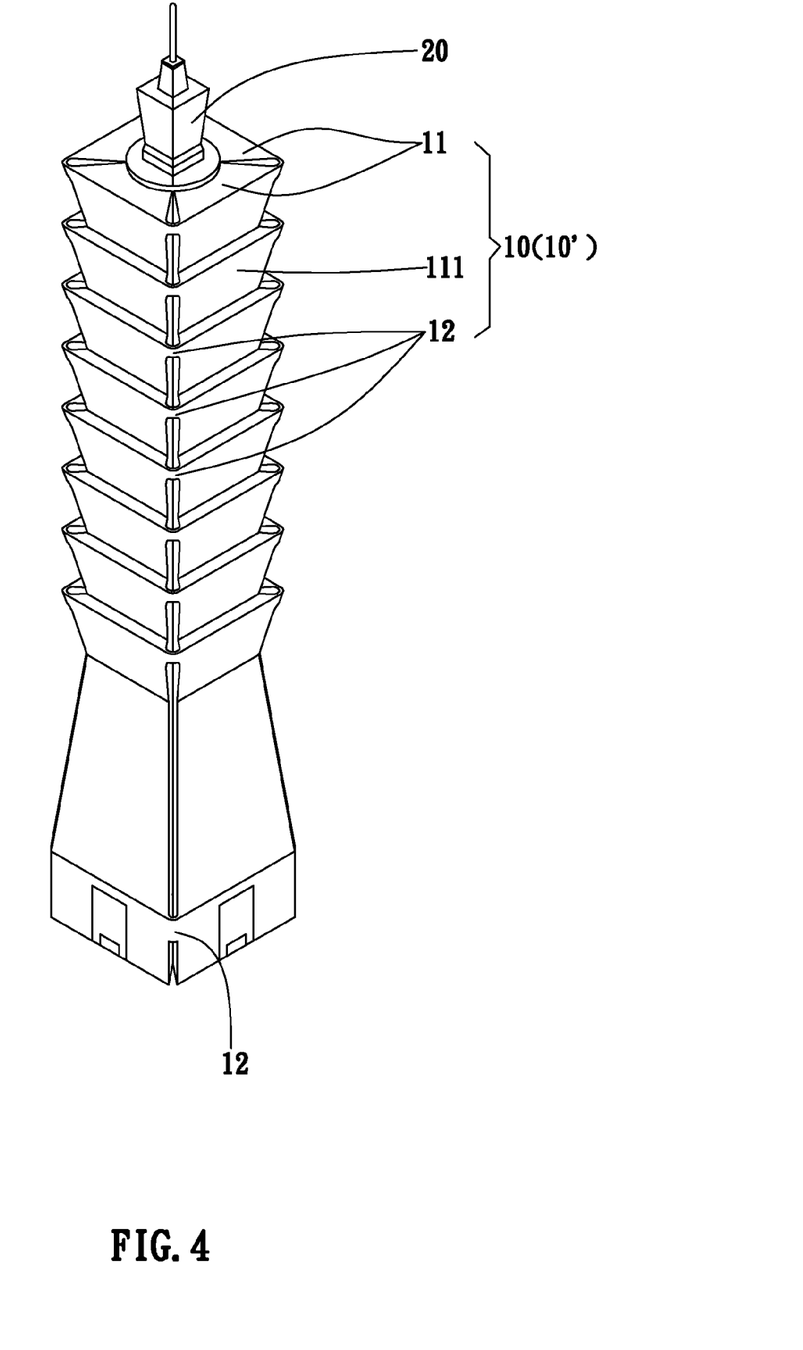
FIG. 4 is a perspective assembled view of the cooling pad and a flash drive composing a decorative structural body.

As shown in FIG. 4, the combinational pads 11 are connected by the connecting portions 12 to compose the cooling pad 10, and can be folded to form a stylish structural body 10' for placing uprightly for decoration and saving space. The inner hole 14 surrounded by the inner surfaces (as shown in FIG. 1) is further provided for inserting and storing the flash drive 20, and the flash drive 20 can be pulled out conveniently.

Figure 5:
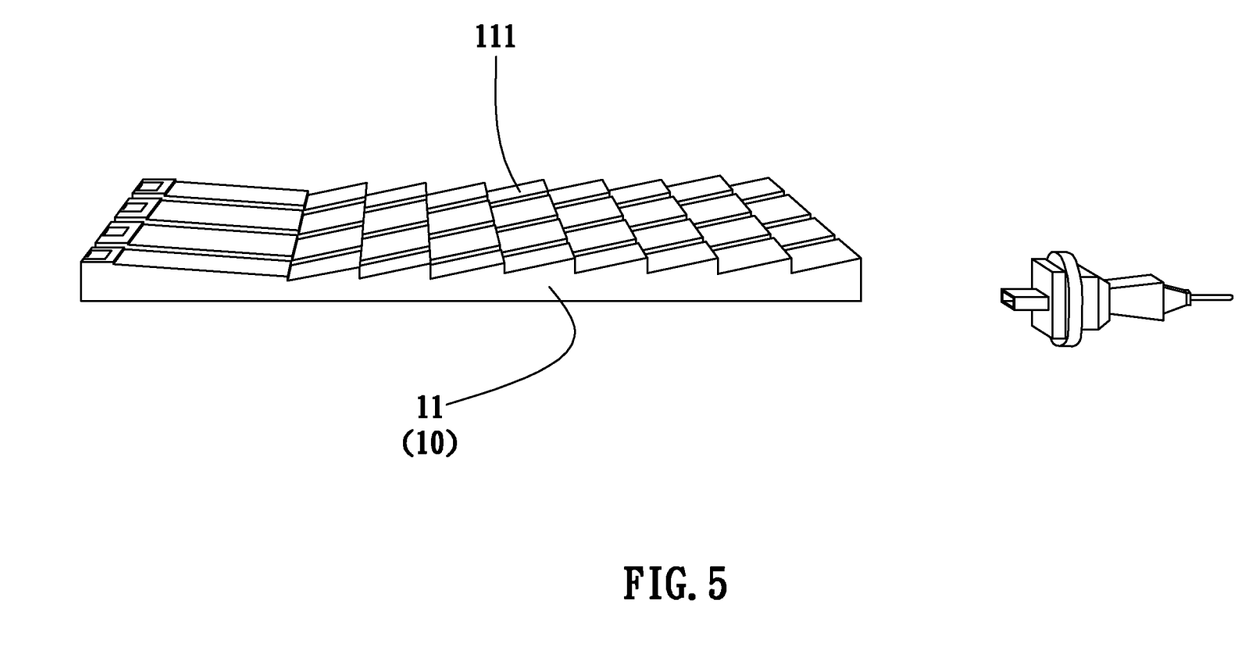
FIG. 5 is a perspective view of the cooling pad being unfolded flatly for forming a structure for usage.
Figure 6:
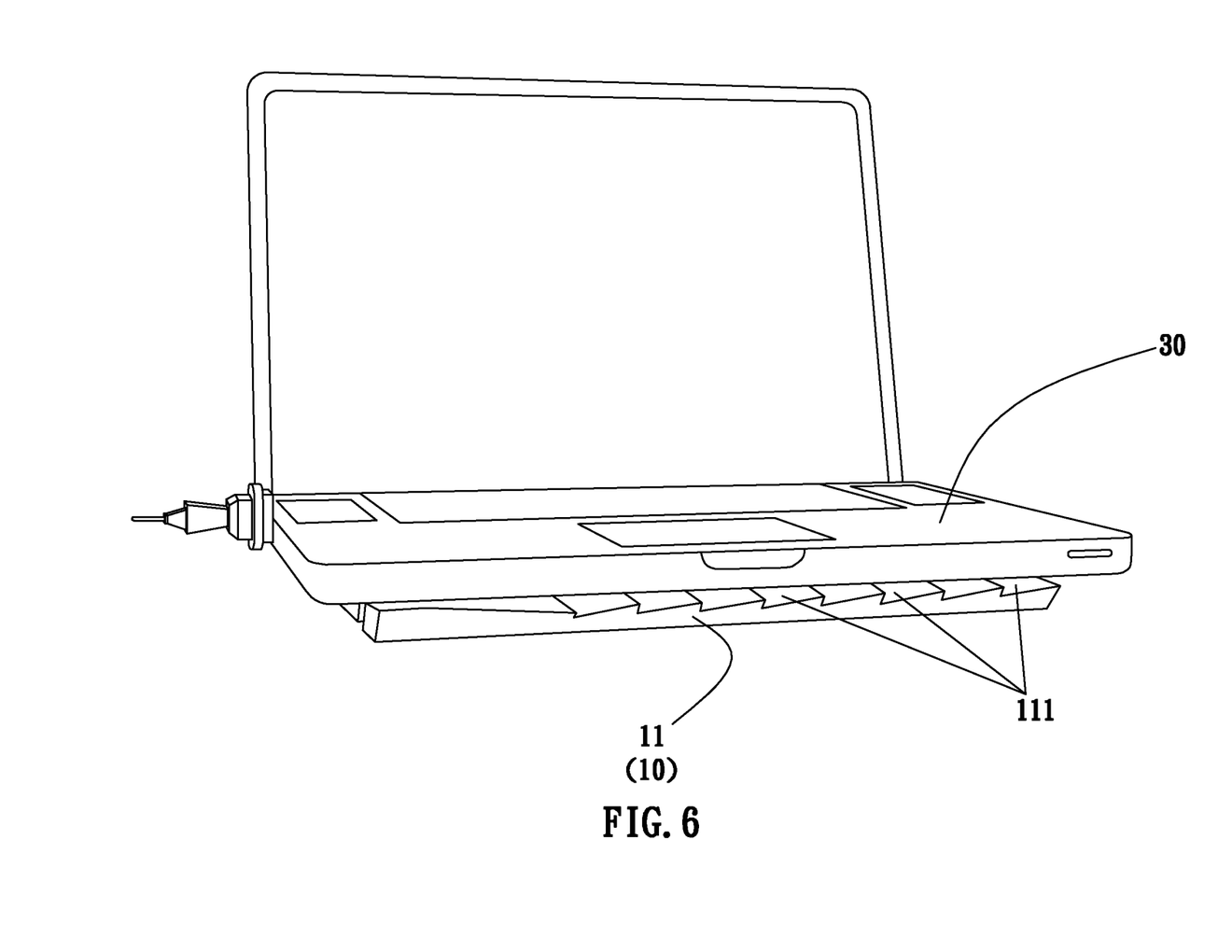
FIG. 6 is a perspective view of the cooling pad and the flash drive provided for using with a laptop.

Please refer to FIG. 5; FIG. 5 is a perspective view of the cooling pad being unfolded flatly for forming a structure for usage. The combinational pads 11 of the cooling pad 10 can be unfolded flatly with the structural surfaces 111 facing upward. As shown in FIG. 6, the cooling pad 10 is provided for supporting a laptop 30, and the accidented structures of the upwardly facing structural surfaces 111 form the temperature dissipation space underneath the laptop 30 for providing the functions of supporting and heat dissipation.

FIGS. 7 to 13 are perspective views showing a second embodiment of the present invention. The combinational cooling pad structure with flash drive storage of the present invention is composed of a cooling pad 40 and the flash drive 20.

Figure 9:
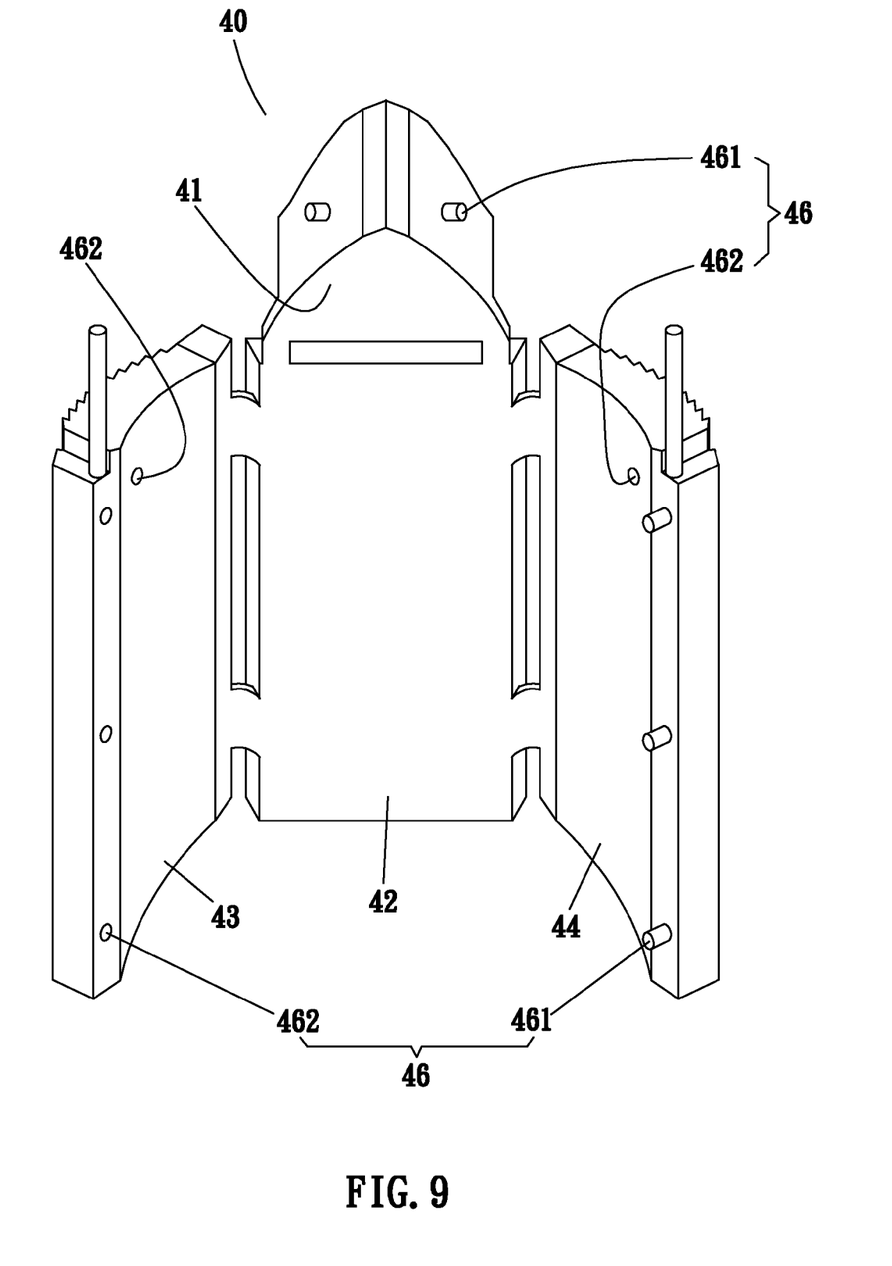
FIG. 9 is a perspective structural view of the cooling pad disposed with the limiting structures according to the second embodiment of the present invention.
Figure 10:
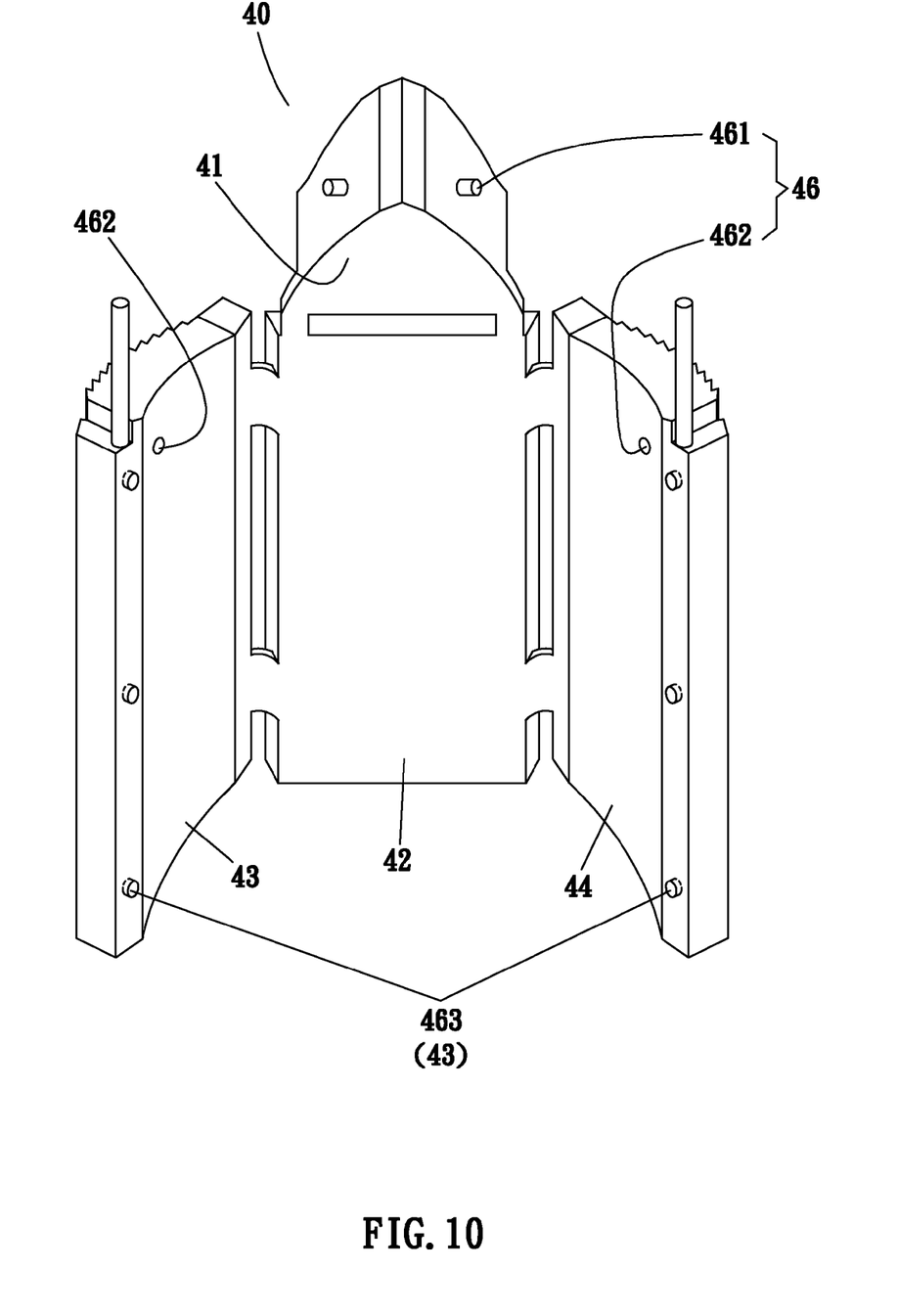
FIG. 10 is a perspective structural view of the cooling pad disposed with the magnetic elements as the limiting structures according to the second embodiment of the present invention.

The cooling pad 40 comprises a first combinational pad 41, a second combinational pad 42, a third combinational pad 43 and a fourth combinational pad 44 with structural surfaces A (as accidented structures of a building in the figures). The first combinational pad 41 is a trilateral pad. The second combinational pad 42 is a long quadrilateral pad. A side of the first combinational pad 41 is connected to a short side of the second combinational pad 42 by at least two connecting portions 45. Two long lateral sides of the second combinational pad 42 are connected to the third combinational pad 43 and the fourth combinational pad 44 respectively by at least two of the connecting portions 45. Limiting structures 46 are correspondingly disposed on outer sides of the third combinational pad 43 and the fourth combinational pad 44. A slot 47 for inserting the flash drive 20 is disposed on an outer surface of the second combinational pad 42. As shown in FIG. 9, the limiting structures 46 are composed of limiting protruded columns 461 and limiting recesses 462 disposed on the corresponding outer sides of the third combinational pad 43 and the fourth combinational pad 44 for securely coupling with each other; or, as shown in FIG. 10, the limiting structures 46 are composed of magnetic elements 463 disposed on the corresponding outer sides of the third combinational pad 43 and the fourth combinational pad 44 for magnetically attracted to each other securely. Furthermore, the limiting protruded columns 461 and the limiting recesses 462 for securely coupling with each other are correspondingly disposed on two lateral sides of the first combinational pad 41 as well as inner surfaces of the third combinational pad 43 and the fourth combinational pad 44 for composing the limiting structures 46 correspondingly.

The flash drive 20 with a main body being shaped as a corresponding structure (as a balcony on a front outer side of a building in this embodiment) for an inserting location of the structural body composed of the combinational pads. The interface connector 22 is protrudingly disposed at one end of the flash drive 20.

Figure 7:
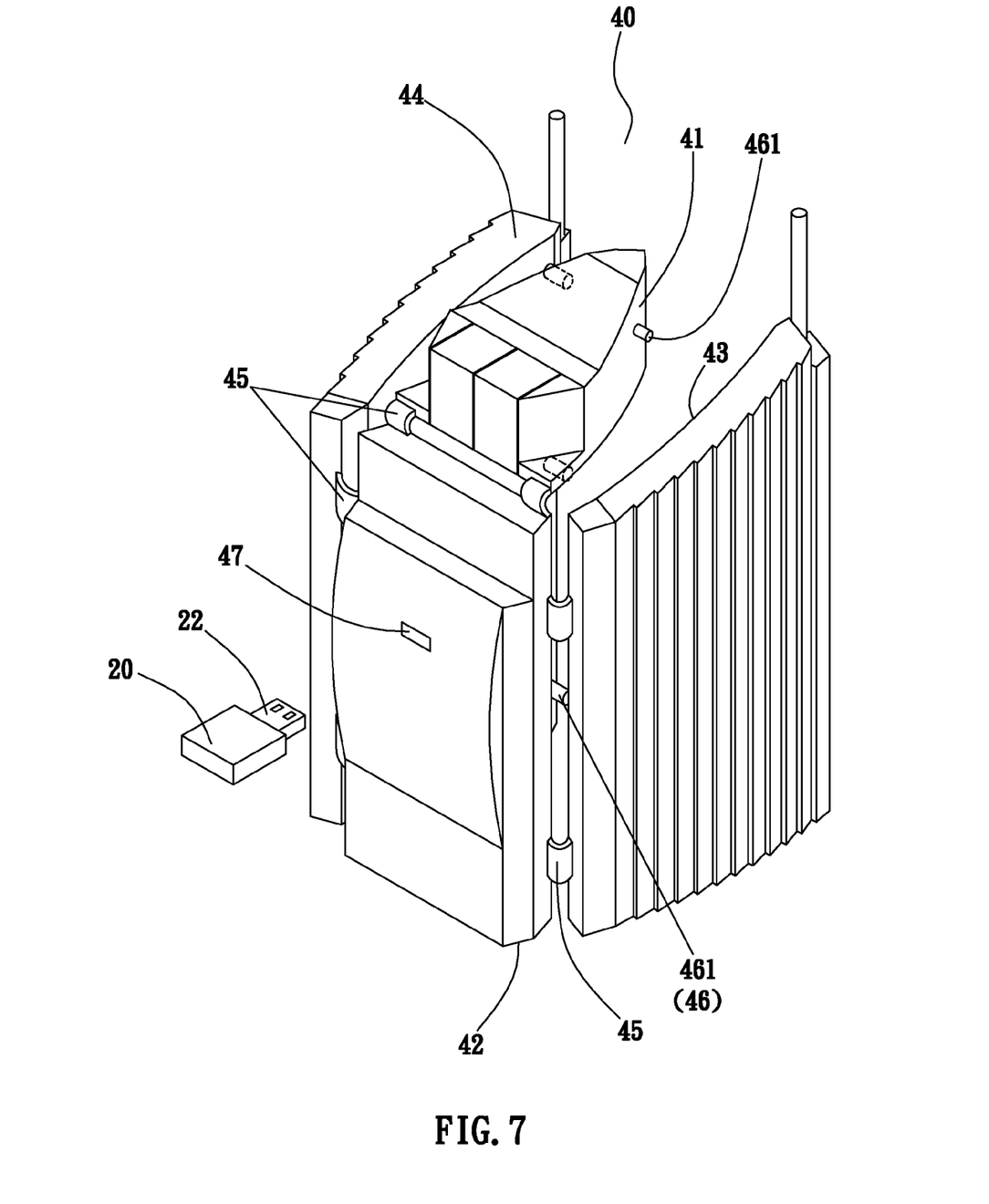
FIG. 7 is a perspective explosive view of the combinational cooling pad structure with flash drive storage according to a second embodiment of the present invention.
Figure 8:
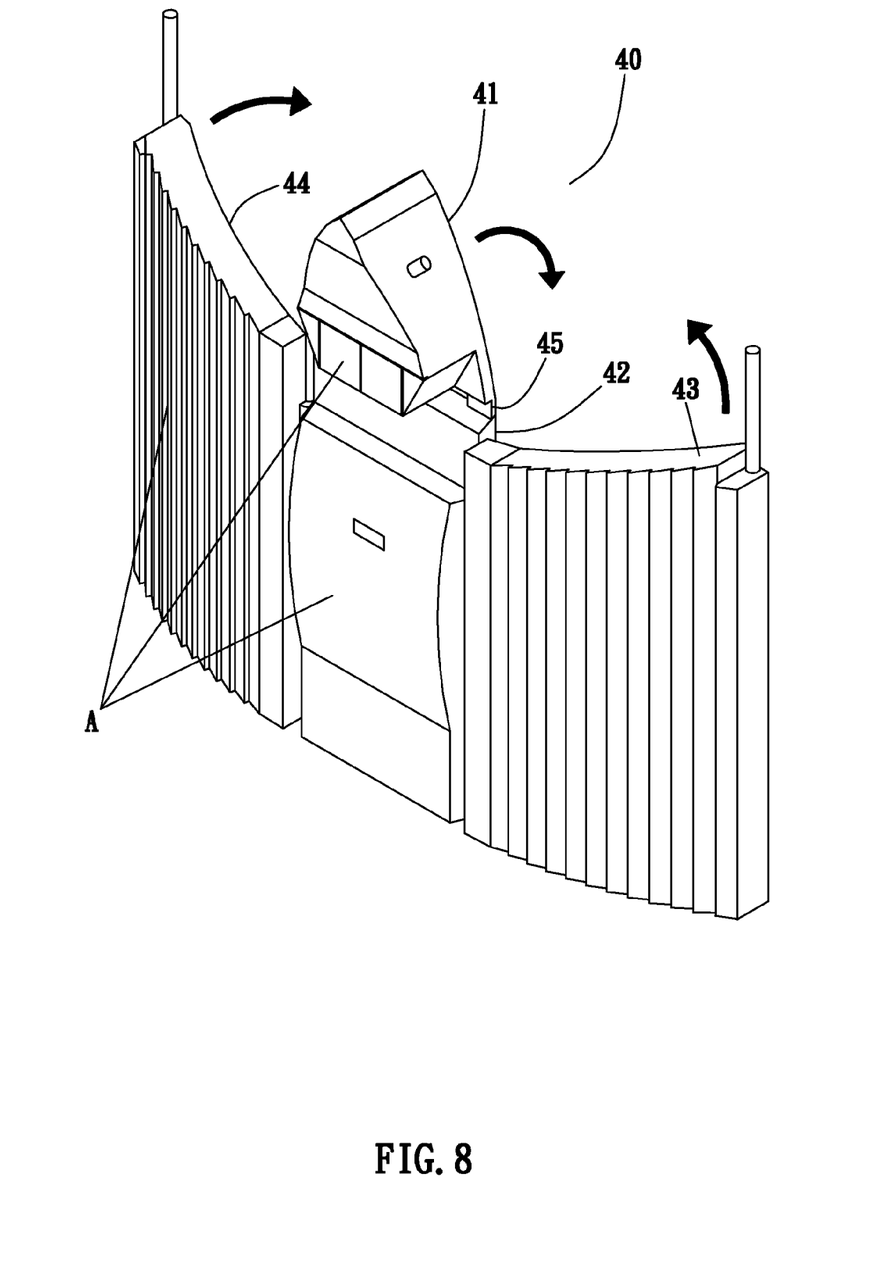
FIG. 8 is a perspective view of the unfolded cooling pad according to the second embodiment of the present invention.

As shown in FIGS. 7 and 8, the connecting portions 45 of the second embodiment of the present invention are tenacious band structures. Moreover, the connecting portions 45 can also be disposed as hinge structures (not shown in the figures). As indicated by arrows in FIG. 8, the first combinational pad 41 of the cooling pad 40 connected by the connecting portions 45 can be folded downwardly relative to the second combinational pad 42, Then, the third combinational pad 43 and the fourth combinational pad 44 can be folded inwardly relative to two sides of the first combinational pad 41 for forming the structural body 10' surrounded by the structural surfaces A of the combinational pads. As shown in FIGS. 9 and 10, the combinational pads can be coupled securely by the limiting structures 46 correspondingly. The interface connector 22 of the flash drive 20 is inserted into the slot 47 on the second combinational pad 42 for forming a structural body 40' of a rough triangular shaped building. The flash drive 20 is structured as the balcony of the building by coupling at a height location on the front outer side of the building for achieving a decorative purpose as shown in FIG. 11.

Figure 11:
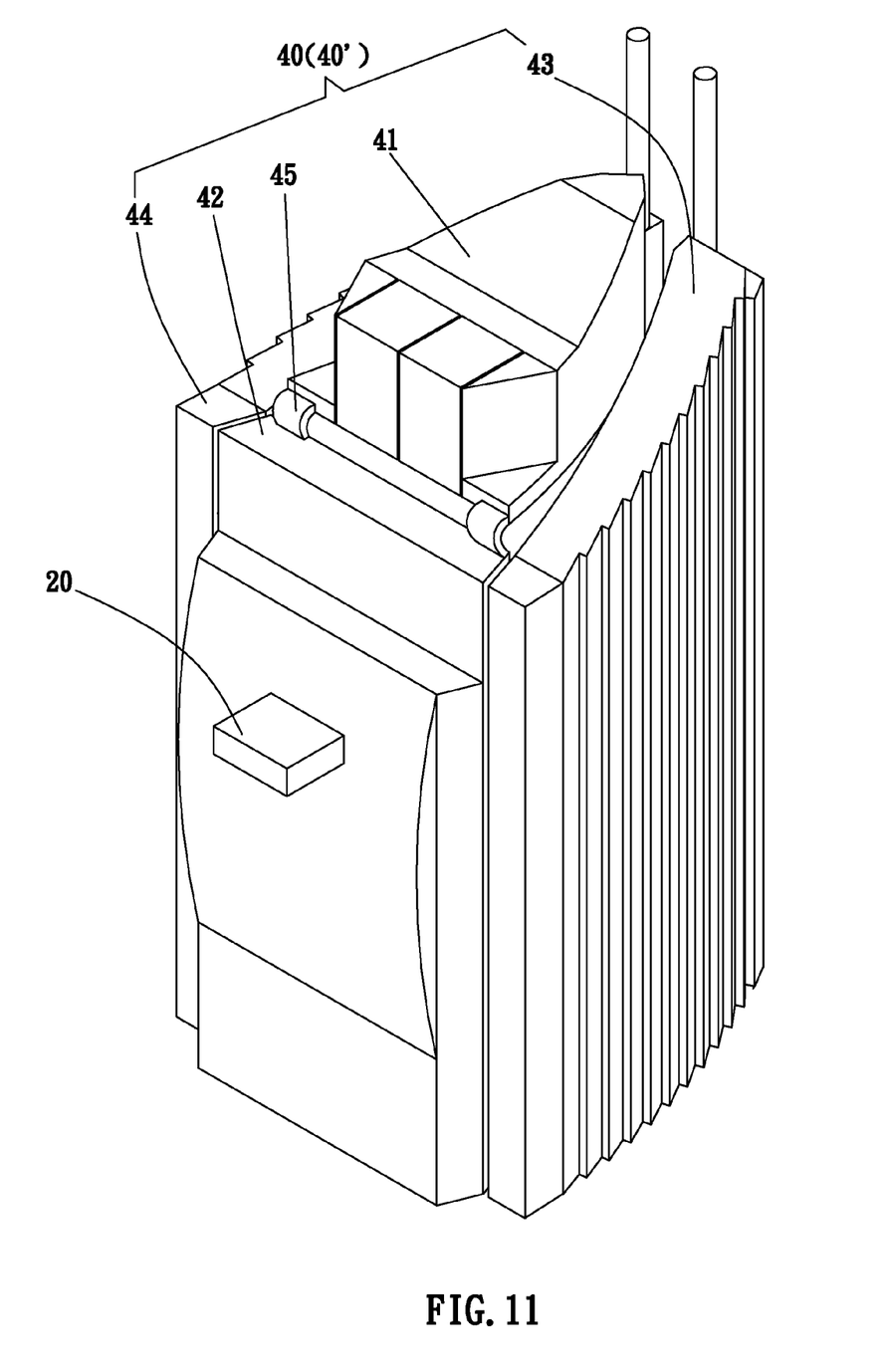
FIG. 11 is a perspective assembled view of the cooling pad and the flash drive composing the decorative structural body according to the second embodiment of the present invention.

As shown in FIG. 11, the first combinational pad 41, the second combinational pad 42, the third combinational pad 43 and the fourth combinational pad 44 are connected by the connecting portions 45 for composing the cooling pad 40 and forming the stylish structural body 40' for placing uprightly for decoration and saving space. The slot 47 of the second combinational pad 42 is provided for the flash drive 20 to insert into as shown in FIG. 7, and the flash drive 20 can be pulled out conveniently.

Figure 12:
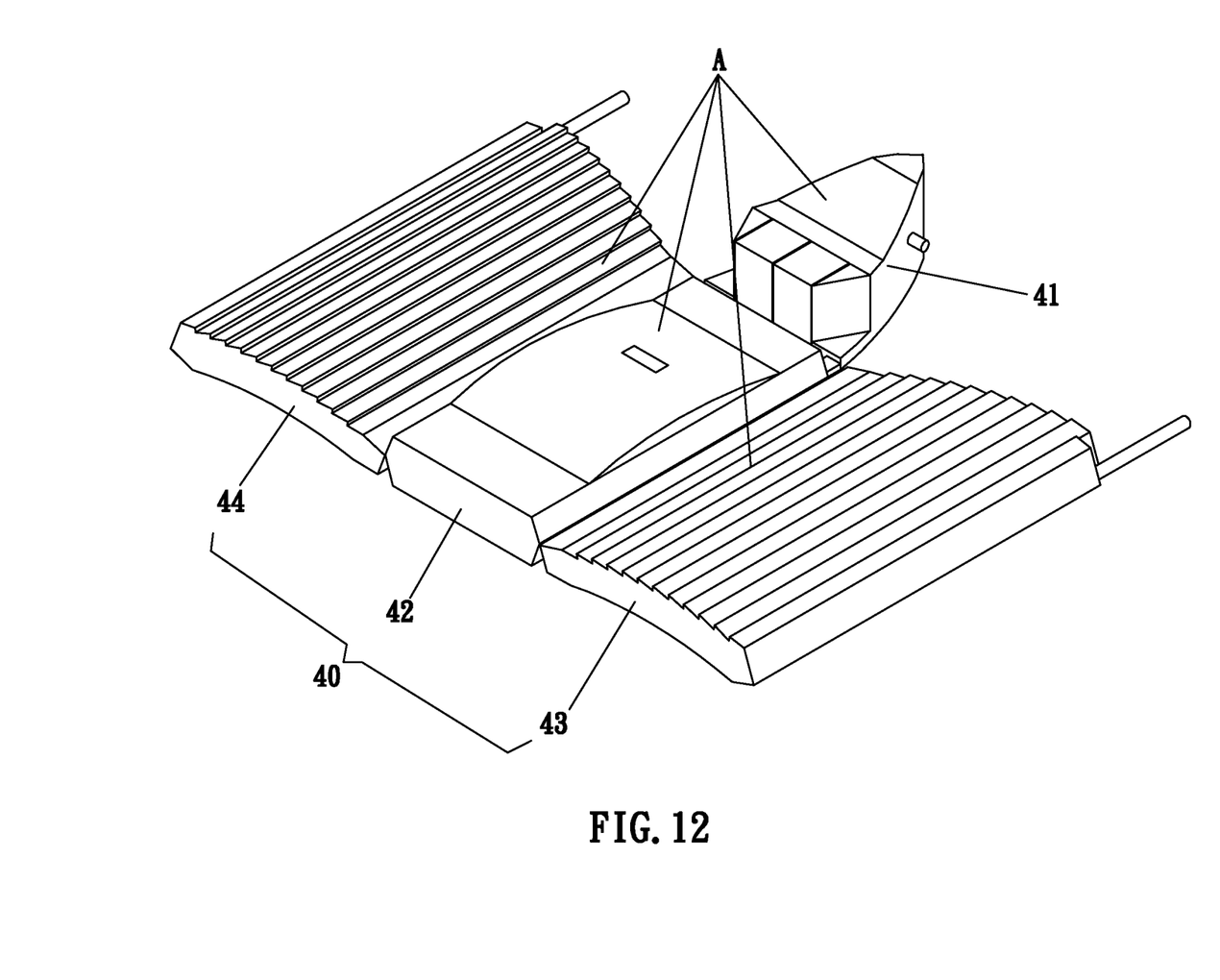
FIG. 12 is a perspective view of the cooling pad being unfolded flatly for forming a structure for usage according to the second embodiment of the present invention.
Figure 13:
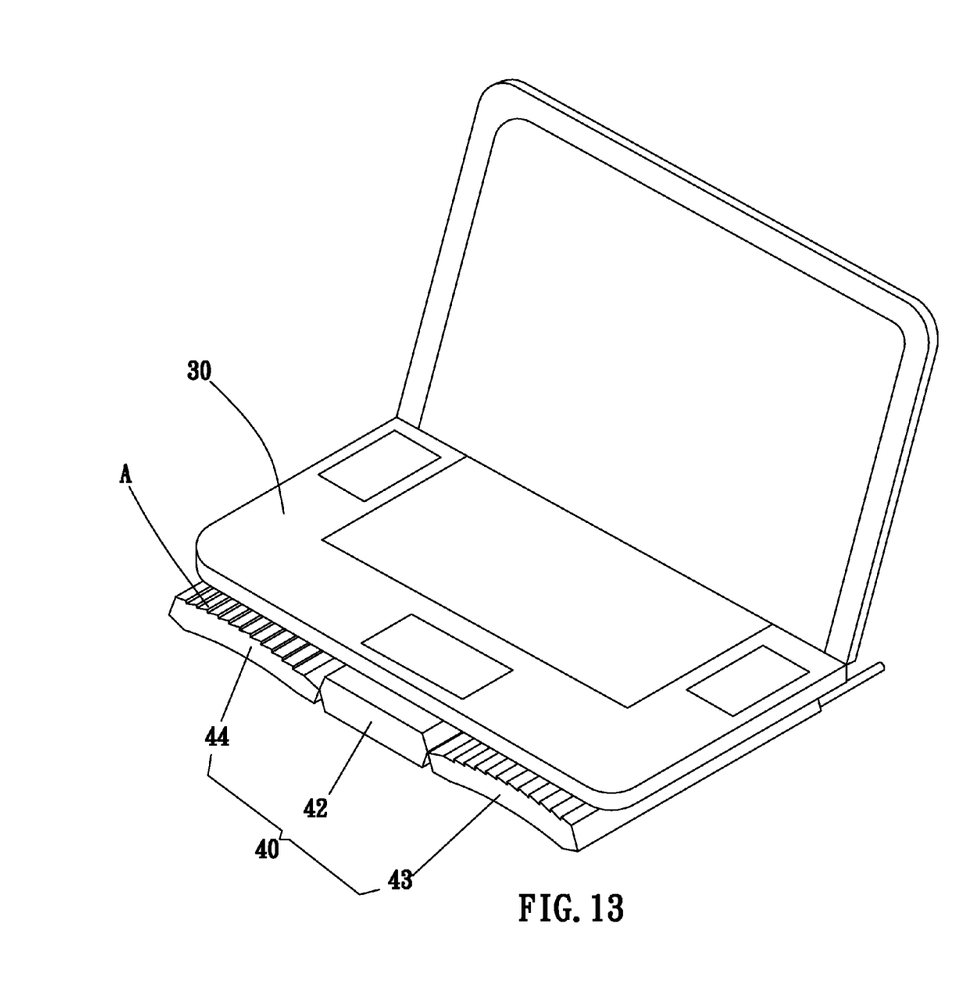
FIG. 13 is a perspective view of the cooling pad and the flash drive provided for placing a laptop on top according to the second embodiment of the present invention.

Please refer to FIG. 12; FIG. 12 is a perspective view of the cooling pad being unfolded flatly for forming a structure for usage according to the second embodiment of the present invention. The first combinational pad 41, the second combinational pad 42, the third combinational pad 43 and the fourth combinational pad 44 of the cooling pad 40 are unfolded flatly with the structural surfaces A facing upward. As shown in FIG. 13, the cooling pad 40 is provided for supporting the laptop 30, and the accidented structures of the upwardly facing structural surfaces A form the temperature dissipation space underneath the laptop 30 for providing the functions of supporting and heat dissipation.

The structural bodies 10' and 40' composed of the combinational cooling pad structure with flash drive storage of the present invention can be designed to match a tourism landmark shape and used as a souvenir for marketing sightseeing spots.

According to the combinational cooling pad structure with flash drive storage of the present invention, the cooling pad composed of the combinational pads coupled by the connecting portions can be unfolded for placing and cooling the laptop; folded to form the stylish structural body for placing uprightly for decoration and saving space; and provided for inserting, storing and pulling out the flash drive conveniently.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A combinational cooling pad structure with flash drive storage comprising:
   a cooling pad comprising at least three combinational pads with structural surfaces, at least two connecting portions being correspondingly disposed between each of the combinational pads, wherein limiting structures are correspondingly disposed on outer sides of the two outer combinational pads, the combinational pads are connected by the connecting portions to form a structure which can be unfolded flatly, are folded closely together to form a structural body surrounded by the structural surfaces, and are combined securely by the corresponding limiting structures, an inner hole for inserting a flash drive is defined and formed by inner surfaces of the surrounding combinational pads; and
   a flash drive with a main body being a corresponding structure for an inserting location of the structural body composed of the combinational pads, a coupling portion being protrudingly disposed at an end of the main body, an interface connector being disposed on the coupling portion, the coupling portion being inserted into the inner hole at an end of the structural body for forming the decorative structural body.

2. The combinational cooling pad structure with flash drive storage as claimed in claim 1, wherein the limiting structures are composed of the limiting protruded columns and the limiting recesses disposed on the outer sides of the two outer combinational pads for securely coupling with each other.

3. The combinational cooling pad structure with flash drive storage as claimed in claim 1, wherein the limiting structures are magnetic elements disposed on the outer sides of the two outer combinational pads for magnetically attracted to each other securely.

4. The combinational cooling pad structure with flash drive storage as claimed in claim 1, wherein the connecting portions are tenacious band structures.

5. The combinational cooling pad structure with flash drive storage as claimed in claim 1, wherein the connecting portions are hinge structures.

6. A combinational cooling pad structure with flash drive storage comprising:
   a cooling pad comprising a first combinational pad, a second combinational pad, a third combinational pad and a fourth combinational pad with structural surfaces, wherein the first combinational pad is a trilateral pad, the second combinational pad is a long quadrilateral pad, a side of the first combinational pad is connected to a short side of the second combinational pad by at least two connecting portions, two long lateral sides of the second combinational pad are connected to the third combinational pad and the fourth combinational pad respectively by at least two of the connecting portions, limiting structures are correspondingly disposed on outer sides of the third combinational pad and the fourth combinational pad, the combinational pads are connected by the connecting portions to form a structure which can be unfolded flatly, are folded closely together to form a structural body surrounded by the structural surfaces, and are combined securely by the corresponding limiting structures, a slot for inserting a flash drive is disposed on an outer surface of any one of the combinational pads; and a flash drive with an interface connector disposed at an end of a main body being inserted into the slot correspondingly, the main body being a corresponding structure for an inserting location of the structural body composed of the combinational pads for forming the decorative structural body.

7. The combinational cooling pad structure with flash drive storage as claimed in claim 6, wherein limiting protruded columns and limiting recesses for securely coupling with each other are correspondingly disposed on two lateral sides of the first combinational pad as well as inner surfaces of the third combinational pad and the fourth combinational pad for composing the limiting structures correspondingly.

8. The combinational cooling pad structure with flash drive storage as claimed in claim 7, wherein the limiting structures are composed of the limiting protruded columns and the limiting recesses disposed on the outer sides of the two outer combinational pads for securely coupling with each other.

9. The combinational cooling pad structure with flash drive storage as claimed in claim 7, wherein the limiting structures are magnetic elements disposed on the outer sides of the two outer combinational pads for magnetically attracted to each other securely.

10. The combinational cooling pad structure with flash drive storage as claimed in claim 7, wherein the connecting portions are tenacious band structures.

11. The combinational cooling pad structure with flash drive storage as claimed in claim 7, wherein the connecting portions are hinge structures.

12. The combinational cooling pad structure with flash drive storage as claimed in claim 6, wherein the limiting structures are composed of the limiting protruded columns and the limiting recesses disposed on the outer sides of the two outer combinational pads for securely coupling with each other.

13. The combinational cooling pad structure with flash drive storage as claimed in claim 6, wherein the limiting structures are magnetic elements disposed on the outer sides of the two outer combinational pads for magnetically attracted to each other securely.

14. The combinational cooling pad structure with flash drive storage as claimed in claim 6, wherein the connecting portions are tenacious band structures.

15. The combinational cooling pad structure with flash drive storage as claimed in claim 6, wherein the connecting portions are hinge structures.

\* \* \* \* \*